United States Patent
Facciorusso et al.

(10) Patent No.: US 8,812,340 B2
(45) Date of Patent: *Aug. 19, 2014

(54) WORKFLOW SYSTEM AND METHOD

(75) Inventors: Christian Facciorusso, Adliswil (CH); Simon Field, Cardiff (GB); Yigal Hoffner, Rifferswil (CH)

(73) Assignee: International Business Machines Corporation, Armonk, NY (US)

( * ) Notice: Subject to any disclaimer, the term of this patent is extended or adjusted under 35 U.S.C. 154(b) by 985 days.

This patent is subject to a terminal disclaimer.

(21) Appl. No.: 12/123,193

(22) Filed: May 19, 2008

(65) Prior Publication Data

US 2008/0288464 A1    Nov. 20, 2008

(51) Int. Cl.
*G06Q 10/00* (2012.01)

(52) U.S. Cl.
USPC .......................................... 705/7.27; 705/7.11

(58) Field of Classification Search
CPC .................................................. G06Q 10/063
USPC ....................... 707/3; 705/7.11, 7.27
See application file for complete search history.

(56) References Cited

U.S. PATENT DOCUMENTS

| | | | | |
|---|---|---|---|---|
| 5,630,070 | A * | 5/1997 | Dietrich et al. | 705/8 |
| 6,092,048 | A * | 7/2000 | Nakaoka | 705/7.15 |
| 6,308,163 | B1 * | 10/2001 | Du et al. | 705/8 |
| 2003/0014410 | A1 | 1/2003 | Lee et al. | |
| 2004/0143477 | A1 * | 7/2004 | Wolff | 705/9 |
| 2008/0288464 | A1 * | 11/2008 | Facciorusso et al. | 707/3 |

FOREIGN PATENT DOCUMENTS

| | | |
|---|---|---|
| JP | 9-245092 | 9/1997 |
| JP | 11-085877 | 3/1999 |
| JP | 11-306244 | 11/1999 |
| JP | 2001-195470 | 7/2001 |
| JP | 2002-032544 | 7/2001 |
| JP | 2001-216381 | 8/2001 |
| JP | 2001-282562 | 10/2001 |
| JP | 2001-319019 | 11/2001 |
| JP | 2002-279119 | 9/2002 |

OTHER PUBLICATIONS

A Workflow Portal Supporting Multi-Language Interoperation and Optimisation—by Huang et al. Concurrency and Computation: Practice and Experience Jan. 31, 2000.*
Cardoso et al. "Semantic E-Workflow Composition," Journal of Intelligent Information Systems, 21:3, 191-225, 2003, XP-002323580.
"Cross-Organisstional Workflow CrossFlow ESPRIT E/28635," Copyright 1999, 2000 by CrossFlow, XP002323581.
"Cross-Organisational Workflow CrossFlow ESPRIT E/28635," Copyright 1990, 2000 by CrossFlow, XP002323627.

(Continued)

*Primary Examiner* — Beth V Boswell
*Assistant Examiner* — Ernest A Jackson
(74) *Attorney, Agent, or Firm* — Michael J. Buchenhorner; Vazken Alexanian

(57) ABSTRACT

Provides workflow systems and methods. A workflow system having a matchmaking unit for receiving a task query from a workflow, and a plurality of task definer units, each providing a definition of a task. The matchmaking unit communicates with the task definer units to evaluate the task definitions against the task query based on at least one property associated with each task definition and provides at least one of the task definitions to the workflow as offers based on the evaluation.

10 Claims, 4 Drawing Sheets

(56) References Cited

OTHER PUBLICATIONS

"E-Business on Demand and Virtual Enterprises," E-Contracting Workshop, RWTH, Aachen, Jun. 26, 2003, XP002323628.

Field et al. "Web Services and Matchmaking," Inderscience Enterprises Ltd, 2003, Int. J. Networking and Virtual Organisations, vol. 2, No. 1, XP002323626.

* cited by examiner

WORKFLOW SYSTEM AND METHOD

FIELD OF THE INVENTION

The present invention relates broadly to a workflow system and method.

BACKGROUND

Workflow technology aims to help define, create, co-ordinate and manage a set of tasks undertaken to achieve a specified goal. A workflow typically uses a step by step description of the tasks that are to be performed and a low level detailed description of each task. The full specification of the possible tasks and possible flow of control is part of the workflow specification and should be available before a task begins.

Typically, task options with their appropriate selection criteria are possible and available as alternatives in the workflow, but they typically should be predefined and are expected to be included in the workflow specification. Most current workflow systems embed the specification of the task options and the decision making surrounding their selection and configuration into a monolithic description of the workflow.

Workflows often enact business processes involving expertise from different domains, and may therefore have to be all encompassing; that is a large field of expertise is covered. The task of workflow programmers is therefore considerably difficult. They should not only be versed in the workflow language, but they should also posses some expertise in all the relevant areas or at least be able to talk to such experts and extract their knowledge into a centralized description of the workflow. Current workflow systems thus typically offer static and rigid solutions to complex workflow problems, which often would ideally be solved with a high level of flexibility and adaptability.

There is a need in the art to provide an improved workflow system and method which can offer a more flexible and customized solution to complex workflow problems.

SUMMARY

Therefore, in accordance with a first aspect of the present invention there is provided a workflow system comprising a matchmaking unit for receiving a task query from a workflow, and a plurality of task definer units each providing a definition of a task. The matchmaking unit communicates with the task definer units to evaluate the task definitions provided by the respective task definer units against the task query based on one or more properties associated with each task definition and provides one or more of the task definitions to the workflow as offers based on the evaluation.

Suitably, the workflow system additionally comprises an actor/service database for storing data associated with respective ones of a plurality of actor/service instances, and an actor/service selection unit. The actor/service selection unit communicates with the actor/service database to select one or more of the actor/service instances for conducting a selected task based on the data associated with respective ones of the plurality of actor/service instances.

In accordance with a second aspect of the present invention there is provided a workflow method comprising the steps of receiving a task query from a workflow, maintaining a plurality of task definer units, each providing a definition of a task, and evaluating the task definitions against the task query based on one or more properties associated with each task definition. One or more of the task definitions are provided to the workflow as offers based on the evaluation.

In accordance with a third aspect of the present invention there is provided a computer program, recorded on a medium, for instructing a computer to conduct a workflow method. The program comprises code for receiving a task query from a workflow, code for maintaining a plurality of task definer units, each providing a definition of a task, and code for evaluating the task definitions against the task query based on one or more properties associated with each task definition. The program further comprises code for providing one or more of the task definitions to the workflow as offers based on the evaluation.

DESCRIPTION OF DRAWINGS

The invention and its embodiments will be more fully appreciated by referring to the following detailed description of illustrative embodiments in accordance with the present invention when taken in conjunction with the accompanying drawings, in which.

DETAILED DESCRIPTION

The present invention provides methods, apparatus and systems for improved workflow which can offer a more flexible and customized solution to complex workflow problems Therefore, in accordance with a first aspect of the present invention there is provided a workflow system comprising a matchmaking unit for receiving a task query from a workflow, and a plurality of task definer units each providing a definition of a task. The matchmaking unit communicates with the task definer units to evaluate the task definitions provided by the respective task definer units against the task query based on one or more properties associated with each task definition and provides one or more of the task definitions to the workflow as offers based on the evaluation.

Suitably, the workflow system additionally comprises an actor/service database for storing data associated with respective ones of a plurality of actor/service instances, and an actor/service selection unit. The actor/service selection unit communicates with the actor/service database to select one or more of the actor/service instances for conducting a selected task based on the data associated with respective ones of the plurality of actor/service instances.

In accordance with a second aspect of the present invention there is provided a workflow method comprising the steps of receiving a task query from a workflow, maintaining a plurality of task definer units, each providing a definition of a task, and evaluating the task definitions against the task query based on one or more properties associated with each task definition. One or more of the task definitions are provided to the workflow as offers based on the evaluation.

In accordance with a third aspect of the present invention there is provided a computer program, recorded on a medium, for instructing a computer to conduct a workflow method. The program comprises code for receiving a task query from a workflow, code for maintaining a plurality of task definer units, each providing a definition of a task, and code for evaluating the task definitions against the task query based on one or more properties associated with each task definition. The program further comprises code for providing one or more of the task definitions to the workflow as offers based on the evaluation.

Figure 1:
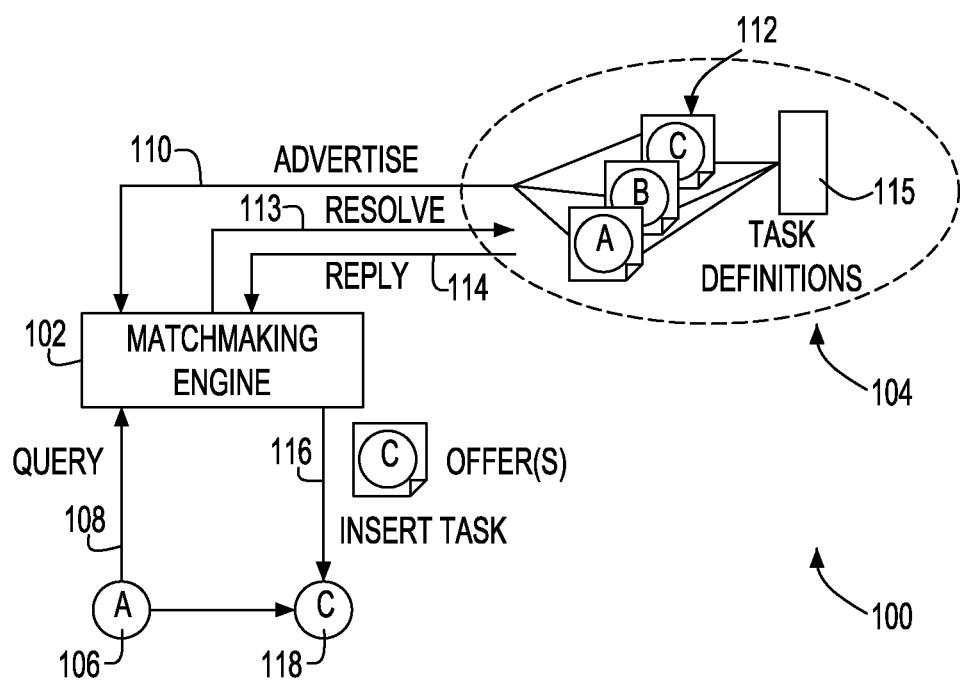
FIG. 1 is a schematic drawing of a workflow system embodying the present invention.

Advantageous embodiments described below provide a workflow systems and methods for facilitating more flexible and customized solutions to complex workflow problems. FIG. 1 is a schematic drawing of a workflow system 100 in an embodiment of the present invention. The workflow system 100 comprises a matchmaking engine 102 and a task pool 104. The task advertisements are communicated between the task definers eg. 112 and the matchmaking engine 102 as indicated at numeral 110. Each advertisement comprises of one task definition and one or more properties associated with the task definition based on which the matchmaking process evaluates the query against each of the advertisements in turn.

When an activity "A" (an executed task 106) of a workflow finishes, the workflow organises the relevant information such as the goal, history, workflow properties, rules, workflow policy and search policy, and calls the matchmaking engine 102 requesting the next appropriate task definition as indicated at numeral 108. This request constitutes a query. In the matchmaking engine 102, a matchmaking process is initiated and the query is evaluated against each of a plurality of task advertisements from task definers eg. 112 in the task pool 104.

If one or more of the properties associated with task definition of a particular task advertisement are marked as dynamic, the matchmaking engine 102 gathers the necessary properties from the workflow query, and provides them to the relevant task definer eg. 112 as indicated at numeral 113. The task definer, e.g. 112, of the relevant task then supplies the value or values of the dynamic task definition property back to the matchmaking engine 102 as indicated at numeral 114, based on the properties of the workflow query.

This allows the task to be customized specifically for the particular workflow at hand. The customization affected in the example embodiment through the task definers eg. 112 can further be based on any other current external circumstances that may influence the workflow/task, with relevant information being receivable through an interface 115. It is noted that each task definition may include one or more sub-tasks depending on the problem at hand, how a task is specified and the available workflow management system.

A task can be defined in a number of different ways, including, but not limited to, using business process execution language (BPEL), specifying an invocation of a web service as a code segment, or written in a scripting language that the workflow system can interpret or launch.

The matchmaking engine 102 completes the matchmaking process and sends one ("C") or more offers containing task definitions that match the goal of the evolving workflow to the workflow as indicated at numeral 116. A selected task 118 (or tasks to be executed in parallel) is put into place ready to be activated. The previously terminated activity 106 can now proceed to transfer control of the workflow to the task 118, which is then activated and becomes the current activity of the workflow.

Figure 2:
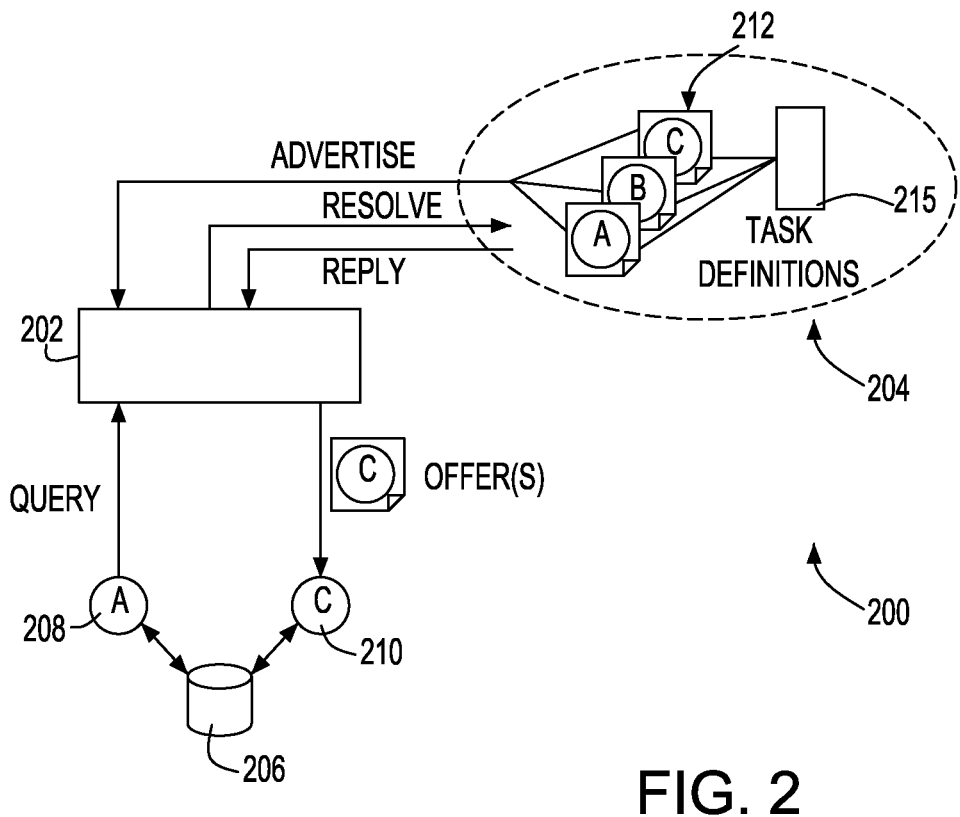
FIG. 2 is a schematic drawing of another workflow system embodying the present invention.

FIG. 2 is a schematic drawing of another workflow system 200 in another example embodiment. The workflow system 200 comprises a web services matchmaking engine 202 and a task pool 204. The workflow system 200 further comprises a database 206 acting as a central repository which holds the history of an evolving workflow. In the workflow system 200, history data of the evolving workflow stored in the database 206 can be provided to the matchmaking engine 202, in the example embodiment via an executed task 208, to be included in the matchmaking process. The matchmaking engine 202 conducts a matchmaking process to identify one or more task offers in communication with task definers eg. 212 in the task pool 204, as previously described with reference to the embodiment shown in FIG. 1 (compare with matchmaking engine 102, task pool 104 and task definers eg. 112).

An interface unit 215 is also provided, having the same function as interface 115 described with reference to FIG. 1.

Again, a selected task or tasks 210 are put into place ready to activated. The previously terminated activity 208 then proceeds to transfer control of the workflow to the task 210, which is then activated and becomes the current activity of the workflow.

One advantage of the use of a central database 206 in the workflow system 200 of this embodiment is that in case a workflow splits into parallel tasks, each evolving flow can find out what the state of the other flow is. The synchronisation and joining of the parallel flows is also facilitated with the use of the central database 206, through which the parallel flows can communicate.

Figure 3:
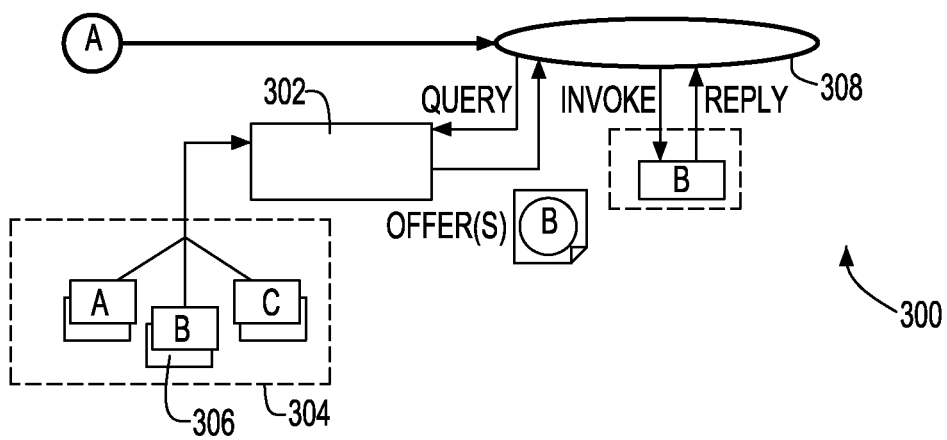
FIG. 3 is a schematic drawing of an extension to the workflow systems in FIG. 1 or 2.

FIG. 3 shows an extension to the workflow systems 100 or 200 (see FIG. 1 or 2 respectively). The extension 300 comprises an actor/service instance selection unit 302, and a pool or database 304, storing data associated with a plurality of actor/service instances eg. 306. Once a next task has been selected by the workflow (see description above with reference to FIG. 1 or 2) and activity 308 has been activated, the actor/service selection unit 302, upon a query initiated as part of the activity 308, interrogates the actor/service pool 304 for selection of an actor/service instance to enact a selected type of service as part of the task. The selection/interrogation can be based on information from the workflow and/or external information, similar to the matching of the task queries with the advertisements from the task pools described above with reference to FIG. 1 or 2.

A response or offer from the actor/service selection unit 302 then identifies one or more available actor/service instances, eg. "B" in FIG. 3, for selection and activation by the activity 308. It may occur that, after a successful task selection, it is found that no actor/service instance is available to carry out a desired service. In such a case, the workflow can "return" to a renewed task selection as described above with reference to FIG. 1 or 2. The renewed task selection is based on updated workflow properties, now taking into account the unavilability of a particular actor/service instance. It is noted that the actor/service selection unit 302 may be implemented on the same or similar platform, eg. the same web services matchmaking engine, as the matchmaking engines 102 or 202 (FIG. 1 or 2 respectively).

Figure 4:
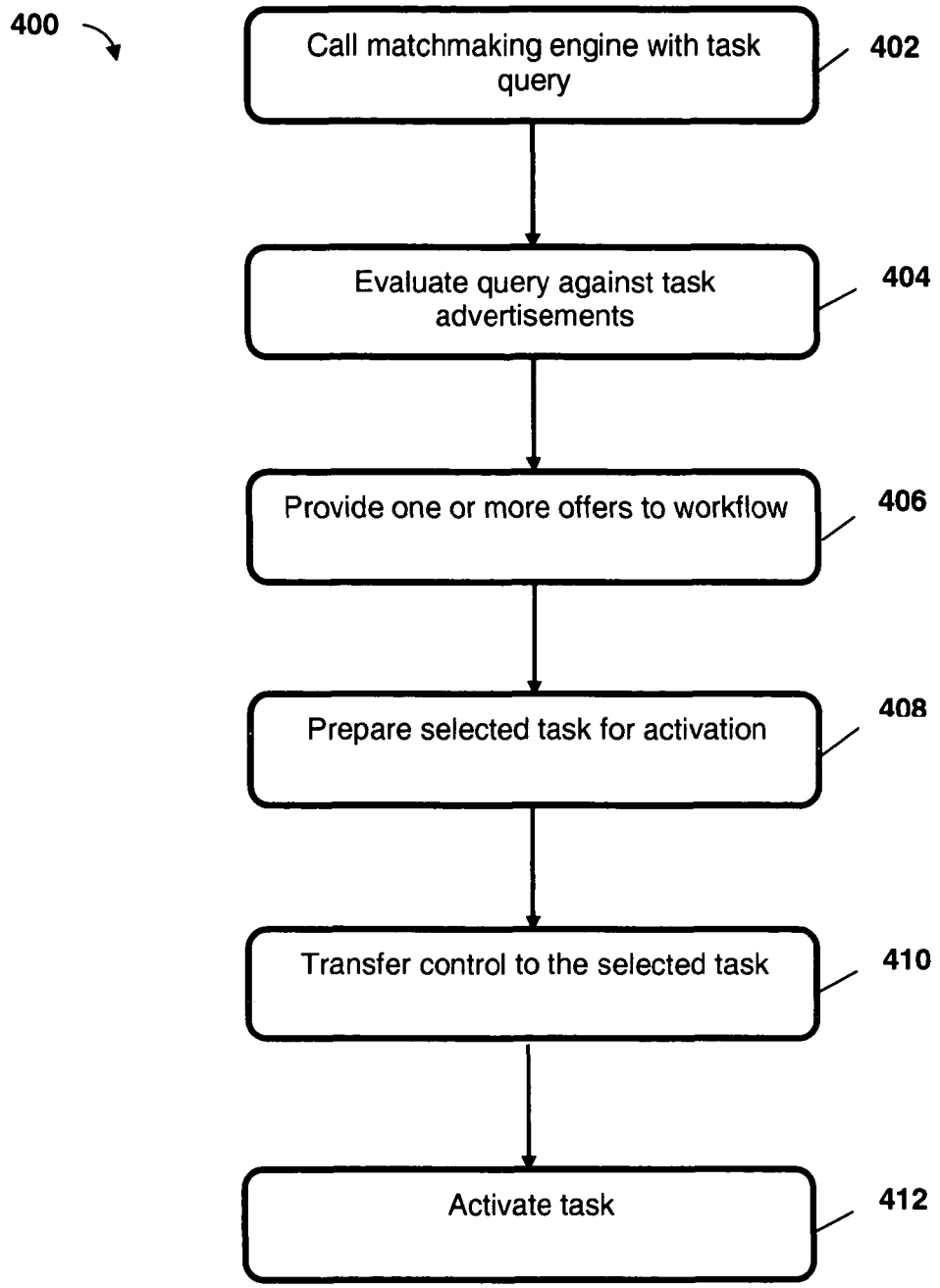
FIG. 4 is a flowchart of a workflow method embodying the present invention.

FIG. 4 shows a flow chart 400 summarising a workflow method embodying the present invention. When an executed task finishes, it organises the relevant workflow information and calls a matchmaking engine requesting the next appropriate task, at step 402. The matchmaking process is initiated and the query is evaluated against task advertisements at step 404. On completion of the matchmaking process, one or more offers containing tasks that match the goal of the evolving workflow are sent to the workflow at step 406. A selected task from the offered tasks is identified and prepared for activation, at step 408. The activity associated with the previously executed task (compare step 402) proceeds to transfer control to the selected task at step 410, and finally the selected task is activated and becomes the current activity at step 412.

Examples of a workflow in an e-government processes environment are the relocation of an individual, family or a business. Such a process typically demands for de-registration and registration at different councils, notification of change of circumstances to various government departments, application for licenses in the case of a business, interaction with banks, etc.

In an example scenario, a local council would advertise its description of a number of different processes that it supports, ie. it maintains a number of task definers for each of the different processes. One of the processes would be the process for people who are leaving the local council. The advertisement could consist of the name of the council, its location, a description of the process or a reference to a website that either has the description of the process or that could initiate it. A dynamic property associated with the advertisement may distinguish between a person leaving as an individual or as a family. In such cases, there would be different procedures to follow. Different councils would advertise different descriptions of themselves and the processes they offer, making up the pool of potential tasks.

In this scenario, the task query could comprise details of the person leaving, an indication of where they are moving from and to, and the family status. The task query would be launched to the matchmaking engine by the customer who is leaving the council, and the matchmaking engine would initiate a matchmaking process which would compare and evaluate the query against each existing advertisement. Information in the task query would be used in the assessment of any dynamic properties in the advertisements. The advertisement from the appropriate council would be selected based on where the customer is departing from and what his or her circumstances are and how they match with the respective advertisements and their associated properties.

In the following, some advantages and features of the embodiments described are summarised. Instead of pre-specifying the flow of tasks in prior art workflow systems and methods, the example embodiments provide dynamic selection of the next task or tasks as the workflow progresses. This is achieved by replacing the embedded point of decision making in the prior art workflow systems and methods with a call to a symmetric matchmaking engine, where task definitions are advertised from a task pool unit.

In the example embodiments, both the evolving workflow and the tasks can describe themselves what they demand of the other party and what their selection criteria are. Thus, symmetric matchmaking is used to select the next task to be performed in the evolving workflow and provision is made to also customize the task for the specific workflow at the same time.

These characteristics may be summarised as follows:
task choice is provided at the termination of each and every activity;
the pool of choices is moved outside the workflow, where the workflow can search for the next tasks to be performed;
selection is allowed to be done partly or fully outside the workflow;
selection is expended to be a two way (symmetric) selection, i.e. the workflow selects the next task and the task selects the workflow.

In the example embodiments, each task provides a description of itself in terms of attributes that are relevant to its characterisation. Some of the attributes may refer to the relationship between a high level goal and this task. Each task further provides the conditions/rules upon which it will deem itself appropriate for the progress of the workflow.

The workflow, in turn, provides a description of itself, which includes the goal, the history, and conditions/rules associated with the workflow. The goal is a description of what the workflow is expected to achieve, while the history of the workflow is a description of what has already been carried out to achieve this goal. The conditions/rules that the workflow owner wishes to apply to the workflow and its evolution could include a policy that specifies restrictions on the manner in which the goal can be achieved. This may for example be in the form of cost, resource that can be allocated, legal limitations or preferences, and geographical/departmental restrictions on scope of search of the next task.

All of the above information is utilized in the symmetric matchmaking process of the example embodiments, which in turn provides the following characteristics to the selection process:
customization of the task;
up-to-date values of the workflow and the task environment, such as interest rates, resource usage, provider circumstances, expertise available, geographical location, context, etc.

By making a dynamic deferred selection and using the dynamic properties of the symmetric matchmaking engine, it is possible to take into account the most up-to-date view of the workflow and its surroundings in the example embodiments. Therefore, not only does the workflow select the activity, but also in effect the task selects the workflow. This results from the symmetric nature of the matchmaking process as described above.

The example embodiments can be implemented for both fully automated workflows, where the decision making process can be entirely formulated so that a script can execute it, or for semi-automated workflows, where the decision making process is a combination of scripts and people explicit intervention.

The utilization of a matchmaking engine in the example embodiments provides a number of advantages, including the following:
evolution of the workflow. The dynamic aspect of the evolution is achieved by deferring the selection of the next task(s) as late as is possible, i.e. until termination of a previous activity. This allows a selection based on the most up-to-date circumstances to be made.
decision making emphasis shift. The symmetric matchmaking process facilitates the shifting of the emphasis of the decision to were the expertise is. While the evolving workflow can select the next activity, the task can select the workflow by defining rules that refer to the workflow description of itself, its history and its goal. This allows shifting the selection emphasis from the workflow to the task definitions. This gives the domain experts the advantage and allows their expertise to be the determining factor in the evolution of the workflow, while taking into consideration workflow (owner) preferences.

In the described embodiments, domain expertise is exploited in the workflow progression. It is the application domain and hence the person who defines the task that knows the interdependencies among the tasks best, and therefore understands what can and can not be done in parallel. It is therefore appropriate that the available options (with regard to what should be done, in what order it should be done and whether it should be done sequentially or in parallel) are described by the task definer, and thus the task advertiser in the example embodiments. While the user or owner of the workflow remains able to specify their preferences, the onus of the selection is in many cases (particularly where the user has no special expertise in the area), with the provider/advertiser of the activity.

The symmetric matchmaking process allows both sides to provide properties describing themselves and describing what they are looking for. Both sides also supply rules that select or de-select the advertisement. By allowing the consumer owner side the provide properties, the rules that look at those properties are effectively expressed both in the language of the consumer side and the task/activity provider side. This "translation" capability facilitates a translation from a goal and an evolving history of the workflow to a set of tasks and the control flow between them. A second level of selection can be done when searching for the specific actor and resources to enact the task as an activity, as described in the embodiment shown in FIG. 3.

The symmetric matchmaking process facilitates the deferral of the allocation of a value to a property to matchmaking time, allowing a script attached to the advertisement or an exit to an external program or input. The resolution of the value can obtain from the query the details of the evolving workflow, thus taking into account its specific circumstances and preferences. The task definition can be modified at matchmaking time and can be returned in a customized form to the evolving workflow. The deferred resolution of property values also allows the tasks to assess the availability of resources and expertise for carrying out the task.

The matchmaking process can be used to distribute the task definitions and associated rules, enabling different domains, departments, organisations, conglomerates, markets, etc. to offer similar or different tasks that achieve a goal in different ways. A network of matchmaking engines that know of each other can then re-direct the workflow towards external domains of expertise where the appropriate task definitions can be found. The distribution itself can happen at different levels: both the task definition and its execution can be distributed. The distribution offers a unique advantage but also raises the problem of the management of the distributed workflow definition and execution space.

Different degrees of flexibility can be exploited, ranging from the fully pre-defined workflow to a completely open progress workflow, making decisions at the end of each activity. In addition, the same goal can be executed differently depending on:
  processes in which there is no formal definition or strict priority, yet some inter-dependencies exist (buying a house, moving business or private, death in the family, setting up a business, job loss, prolonged illness);
  available task definitions differ between application domains or organisations. Each organisation may have its own way of achieving similar goals;
  locality of the tasks (see e-government example): a task can cross an organisational or geographical boundary and thereafter the flow will be determined by local considerations and policy/regulations;
  available resources differ and vary, affecting the manner in which a goal can be reached.

The example embodiments cater for the transition between an old definition of a task and a new one being installed. Both versions can co-exist as long as is useful, provided the appropriate selection conditions are applied. The distribution of the responsibility to define tasks to where the expertise is alleviates the problem of maintaining large, monolithic and complex workflow definitions.

One specific application embodying the invention is in a Business-to-Customer (B2C) system, where the customer/client interacts with the business/server, and the customer is in charge of the evolving workflow. In the B2C environment, an expert may alternatively use or control the workflow on behalf of the consumer, and making the decisions in conjunction with the consumer.

Another specific application embodying the invention is in a Business-to-Business (B2B) environment, for example a workflow in one organisation who's aim is to purchase a number of related items that are dependent on each other, but from different suppliers.

Embodiments of the invention may be implemented semi-automated where the decision making process is a combination of scripts and people explicit intervention, or fully automated, where the decision making process can be entirely formulated so that a script can execute it.

Figure 5:
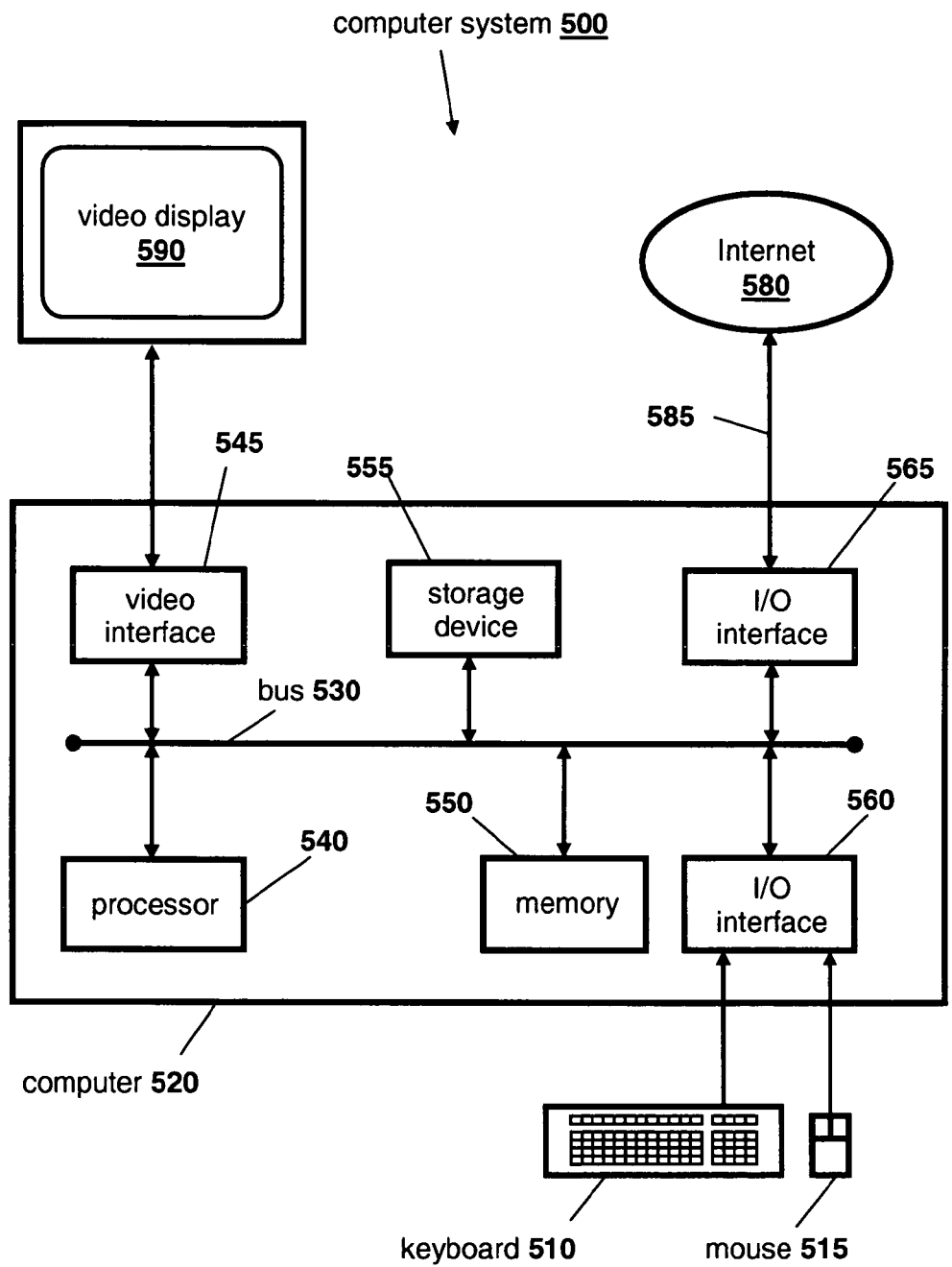
FIG. 5 is a schematic representation of a computer system suitable for performing the techniques described with reference to FIG. 1 to 4.

FIG. 5 is a schematic representation of a computer system 500 that can be used to implement the techniques described herein. Computer software executes under a suitable operating system installed on the computer system 500 to assist in performing the described techniques. This computer software is programmed using any suitable computer programming language, and may be thought of as comprising various software code means for achieving particular steps.

The components of the computer system 500 include a computer 520, a keyboard 510 and mouse 515, and a video display 590. The computer 520 includes a processor 540, a memory 550, input/output (I/O) interfaces 560, 565, a video interface 545, and a storage device 555.

The processor 540 is a central processing unit (CPU) that executes the operating system and the computer software executing under the operating system. The memory 550 includes random access memory (RAM) and read-only memory (ROM), and is used under direction of the processor 540.

The video interface 545 is connected to video display 590 and provides video signals for display on the video display 590. User input to operate the computer 520 is provided from the keyboard 510 and mouse 515. The storage device 555 can include a disk drive or any other suitable storage medium.

Each of the components of the computer 520 is connected to an internal bus 530 that includes data, address, and control buses, to allow components of the computer 520 to communicate with each other via the bus 530.

The computer system 500 can be connected to one or more other similar computers via an input/output (I/O) interface 565 using a communication channel 585 to a network, represented as the Internet 580.

The computer software may be recorded on a portable storage medium, in which case, the computer software program is accessed by the computer system 500 from the storage device 555. Alternatively, the computer software can be accessed directly from the Internet 580 by the computer 520. In either case, a user can interact with the computer system 500 using the keyboard 510 and mouse 515 to operate the programmed computer software executing on the computer 520.

Other configurations or types of computer systems can be equally well used to implement the described techniques. The computer system 500 described above is described only as an example of a particular type of system suitable for implementing the described techniques.

Various alterations and modifications can be made to the techniques and arrangements described herein, as would be apparent to one skilled in the relevant art. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A workflow system comprising:
   a database comprising a history of an evolving workflow;
   a processor device executing instructions from memory;
   the memory, operably coupled with the processor device, and storing the instructions comprising:
   upon termination of a current task in the evolving workflow:
      receiving from the current task:
         a description of the evolving workflow comprising a goal, history, conditions, and rules associated with said evolving workflow;
         a task query comprising a request for a next appropriate task definition, wherein said next appropriate task definition describes a task in terms of attributes that are relevant to its characterization, and conditions/rules upon which said task is appropriate for progress of the workflow, wherein said attributes are not inherited from other tasks; and
      receiving from task definer units a plurality of task definitions as candidates for the next appropriate task definition;
   evaluating the plurality of the task definitions received from the task definer units against the task query based on at least one property associated with each task definition to select the next appropriate task definition; and
   providing at least one task definition to the current task as an offer based on the evaluation, wherein said at least one task definition matches the goal of said workflow, whereupon a next task matching the at least one task definition is selected by the current task and put into place, ready to be activated;
   basing the selection of the next task on a most up-to-date circumstance by deferring selection of the next task until termination of the current task;
   activating the next task only when the previously terminated activity transfers control of the workflow to said next task, whereupon the next task becomes the current task.

2. The workflow system of claim 1, wherein evaluating the plurality of the task definitions comprises:
   gathering necessary properties from the task query;
   providing the necessary properties to the task definer units, wherein said necessary properties are based on the workflow; and
   wherein the task definer units associated with the task then supplies a value or values of the task definition property back to the processor device.

3. The workflow system of claim 1, wherein receiving from the task definer units further comprises:
   receiving a dynamic property associated with the task definitions; and
   providing properties of the existing workflow from which the task query is received to at least one of the task definer units, whereby the task definer units provide specific value or values of the dynamic properties to the processor device based on the received properties of the workflow.

4. The workflow system of claim 1, further comprising an interface unit for transceiving data external to the workflow associated with at least one of the task definitions, the respective task definer units updating the task definitions based on said data.

5. The workflow system of claim 1, further comprising a database for storing workflow data associated with the workflow, wherein the database functions as a central repository and is in communication with current task or tasks of the workflow, and wherein the task query is based on said data stored in the database.

6. A workflow method comprising:
using a processor device, performing:
- communicating with a database comprising a history of an evolving workflow;
- upon termination of a current task in the evolving workflow:
  - receiving from the current task:
    - a description of the evolving workflow comprising a goal, history, conditions, and rules associated with said evolving workflow;
    - a task query comprising a request for a next appropriate task definition, wherein said next appropriate task definition describes a task in terms of attributes that are relevant to its characterization, and conditions/rules upon which said task is appropriate for progress of the workflow, wherein said attributes are not inherited from other tasks; and
  - receiving from task definer units a plurality of task definitions as candidates for the next appropriate task definition;
  - evaluating the plurality of the task definitions received from the task definer units against the task query based on at least one property associated with each task definition to select the next appropriate task definition; and
  - providing at least one task definition as an offer based on the evaluation, wherein said at least one task definition matches the goal of said workflow, whereupon a next task matching the at least one task definition is selected and put into place, ready to be activated;
  - basing the selection of the next task on a most up-to-date circumstance by deferring selection of the next task until termination of the current task;
  - activating the next task only when the previously terminated activity transfers control of the workflow to said next task, whereupon the next task becomes the current task.

7. The workflow method of claim 6 wherein evaluating the plurality of the task definitions comprises:
- gathering necessary properties from the task query;
- providing the necessary properties to the task definer units, wherein said necessary properties are based on the workflow; and
- wherein the task definer units associated with the task then supplies a value or values of the task definition property back to the processor device.

8. The workflow method of claim 6 further comprising:
updating the task definitions based on properties external to the evolving workflow.

9. The workflow method of claim 6 wherein at least one of properties associated with the task definitions is dynamic, and the method further comprises the step of utilizing at least one specific value of the dynamic properties based on properties of the workflow in the evaluation of the tasks.

10. A computer program product comprising a non-transitory computer readable medium with computer instructions stored thereon for implementing a workflow method, said computer instructions comprising:
- communicating with a database comprising a history of an evolving workflow;
- upon termination of a current task in the evolving workflow:
  - receiving from the current task:
    - a description of the evolving workflow comprising a goal, history, conditions, and rules associated with said evolving workflow;
    - a task query comprising a request for a next appropriate task definition, wherein said next appropriate task definition describes a task in terms of attributes that are relevant to its characterization, and conditions/rules upon which said task is appropriate for progress of the workflow, wherein said attributes are not inherited from other tasks; and
  - receiving from task definer units a plurality of task definitions as candidates for the next appropriate task definition;
  - evaluating the plurality of the task definitions received from the task definer units against the task query based on at least one property associated with each task definition to select the next appropriate task definition; and
  - providing at least one task definition as an offer based on the evaluation, wherein said at least one task definition matches the goal of said workflow, whereupon a next task matching the at least one task definition is selected and put into place, ready to be activated;
  - basing the selection of the next task on a most up-to-date circumstance by deferring selection of the next task until termination of the current task allows;
  - activating the next task only when the previously terminated activity transfers control of the workflow to said next task, whereupon the next task becomes the current task.

* * * * *